F. L. BAILEY AND J. H. LA GRANT.
RESILIENT CORE FOR TIRE CASINGS.
APPLICATION FILED AUG. 18, 1919.

1,339,876.

Patented May 11, 1920.

INVENTORS
Fred L. Bailey and
John H. La Grant
BY William C. Edwards Jr.

ATTORNEY.

UNITED STATES PATENT OFFICE.

FRED L. BAILEY AND JOHN H. LA GRANT, OF WICHITA, KANSAS.

RESILIENT CORE FOR TIRE-CASINGS.

1,339,876.  Specification of Letters Patent.  Patented May 11, 1920.

Application filed August 18, 1919. Serial No. 318,318.

*To all whom it may concern:*

Be it known that we, FRED L. BAILEY and JOHN H. LA GRANT, citizens of the United States, and residents of Wichita, in the county of Sedgwick and State of Kansas, have invented certain new and useful Improvements in Resilient Cores for Tire-Casings, of which the following is a description, referring to the accompanying drawings, which form a part of this specification.

Our invention provides a built up resilient core adapted to be used in place of a pneumatic tube within a tire casing, said core being strengthened against side spreading by fabric layers embedded transversely therein together with other novel features essential to the proper coaction of the elements, the principles and purposes of the invention being to eliminate the tire troubles commonly experienced such as blowouts and punctures whereby automobile operation is rendered more safe and satisfactory and without sacrificing the resiliency essential to such operation.

Figure 1:
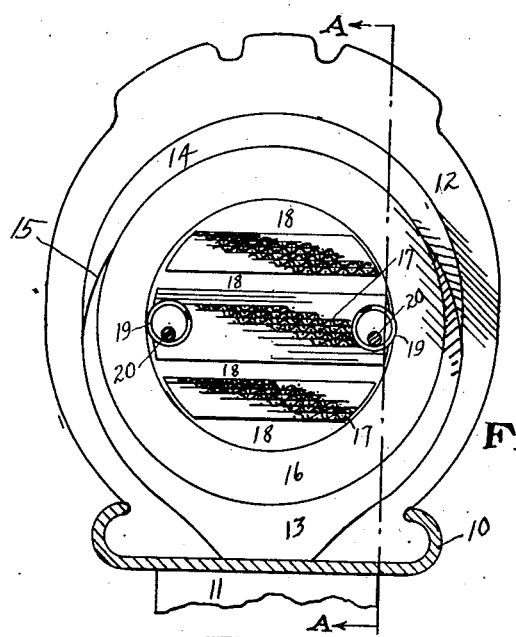
Figure 2:
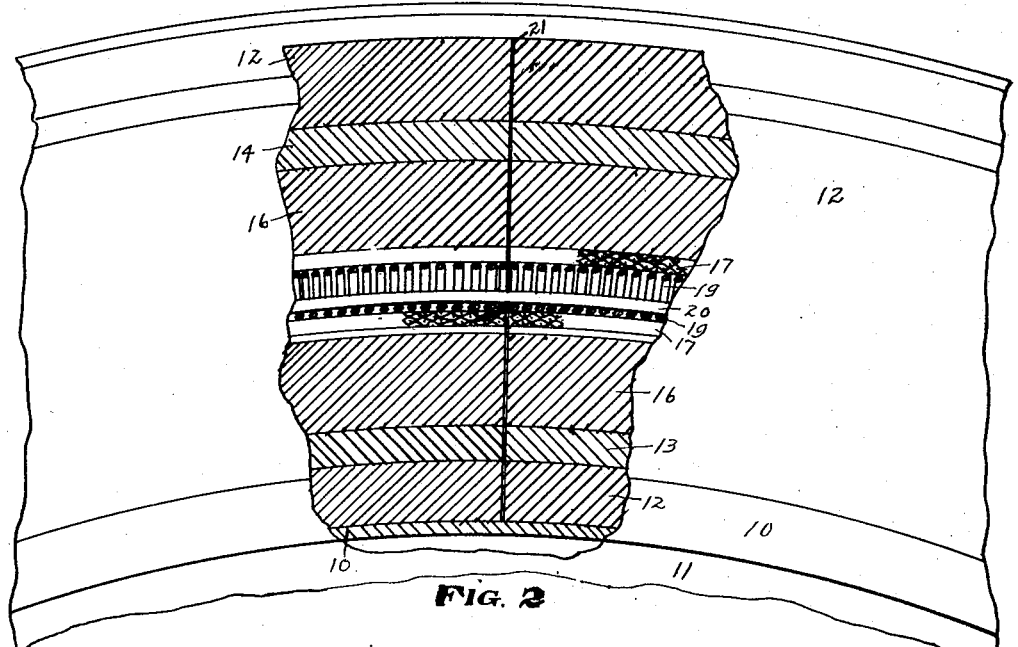

In the drawings Figure 1 shows a sectional outlined view of our improved core as arranged within a tire casing carried by rim elements of an automobile wheel. Fig. 2 is a fragmentary side elevation of the wheel and tire casing disclosed in Fig. 1 with portions removed along the line A—A looking in the direction of the arrows to disclose construction features of our invention as shown therein. Similar numerals of reference being employed to disclose corresponding parts throughout the drawings.

Referring to the drawings, 10 represents a rim on an automobile wheel 11. A tire casing 12 is shown engaged within a rim 10 in the customary manner. Our improved resilient core comprises the elements included within the casing 12. The space immediately adjacent the inner wall of the casing 12 intermediate the beads thereof and extending outwardly for a distance along both side portions of said casing is occupied by an inner elastic, longitudinally extending element 13 such as rubber and contiguous the under side of the tread portion of the casing 12 is shown an outer elastic, longitudinally extending rubber element 14 capping said lower element as seen at 15. Within the elements 13 and 14 is a longitudinally extending elastic cylindrical element 16 also preferably fabricated of rubber. Within this element 16 extends a central elastic element composed of a plurality of transverse layers of fabric 17, spaced apart, and longitudinally extended and embedded in a material 18 such as rubber. The purpose of the fabric layers 17 is to reinforce the rubber sidewise, preventing spreading of the core under load while permitting the rubber to compress and expand in a vertical direction to secure the desired resiliency. A pair of coiled springs 19 extend longitudinally in the core as disclosed, they provide spring resiliency, serve as a longitudinal reinforcement to the core and act as conduits within which wires 20 may be passed and then be joined as a wire ring to unite the longitudinally extending core elements whose ends have been brought into contact as at 21 within the casing 12. The method of fastening the ends of the wire 20 to effect a closed wire ring is not an essential feature of the invention, but may consist of spreading temporarily from their abutting relationship as at 21, the ends of the core elements to permit of electric welding of the abutting ends of the wire 20, or if desired the ends might be mechanically joined by twisting or otherwise. The resilient inner and outer elements 13 and 14 are employed in conjunction with the inner cylindrical element 16 and its contained members for the purpose of adjusting this inner portion to fill the entire area within the tire casing; that is by employing various sizes and thicknesses of elements 13 and 14, an inner cylindrical element of constant diameter will answer with tire casings of varied sizes, the wire elements 20 serving to unite the composite core embodying the elements 13, 14 and 16 and allied members as previously disclosed.

Such modifications may be employed as regards the actual size, shape and manufacture of the combination of elements composing our invention as lie within the scope of the appended claims.

Having fully described our invention, what we now claim as new and desire to secure by Letters Patent is;

1. A resilient core for tire casings including a central longitudinally extending elastic element having a plurality of parallel layers of fabric, spaced apart and embedded therein, a pair of coiled wire conduits longitudinally extending within said elastic element, a wire tie within each of said conduits, a cylindrical elastic element enveloping said central element; an inner resilient covering element enveloping the inner side of said cylindrical element and an outer resilient covering element capping the outer side of said cylindrical element and the side edges of said inner covering element.

2. In combination within a tire casing as mounted upon a wheel rim, a longitudinally extending resilient core including a central elastic element having a plurality of parallel layers of fabric, spaced apart, embedded therein; a pair of coiled wire conduits longitudinally extending within said elastic element, a wire tie within each of said conduits, a cylindrical elastic element enveloping said central element; an inner resilient covering element intermediate the bead portions of said casing and inner side of said cylindrical element and an outer resilient covering element intermediate the tread portion of said casing and the outer surface of said cylindrical element, said outer covering element capping the side edges of said inner covering element; said wire ties serving to unite and secure the composite elements of the core within said casing as specified.

FRED L. BAILEY.
JOHN H. LA GRANT.

Witnesses:
CHARLES S. THACHER,
C. A. COLE.